Aug. 6, 1940.                J. G. RITTER                2,210,731
                          MOTOR COMPRESSOR UNIT
                           Filed April 23, 1938

WITNESSES:
R. J. Eisinger
E. H. Lutz

INVENTOR
JOHN G. RITTER.
BY
ATTORNEY

Patented Aug. 6, 1940

2,210,731

UNITED STATES PATENT OFFICE 2,210,731

MOTOR COMPRESSOR UNIT

John G. Ritter, Springfield, Mass., assignor to Westinghouse Electric & Manufacturing Company, East Pittsburgh, Pa., a corporation of Pennsylvania Application April 23, 1938, Serial No. 203,787

2 Claims. (Cl. 308—161)

My invention relates to a motor compressor unit, and it has for an object to provide an improved structure thereof.

A particular object is to provide improved means for fixing the longitudinal position of the shaft.

Another object is to provide means for fixing the longitudinal position of the shaft which is not materially affected by expansions due to temperature changes.

Another object is to provide means for fixing the longitudinal position of the shaft which involves a minimum of difficulty and cost in the manufacture of the motor compressor unit.

Figure 1:
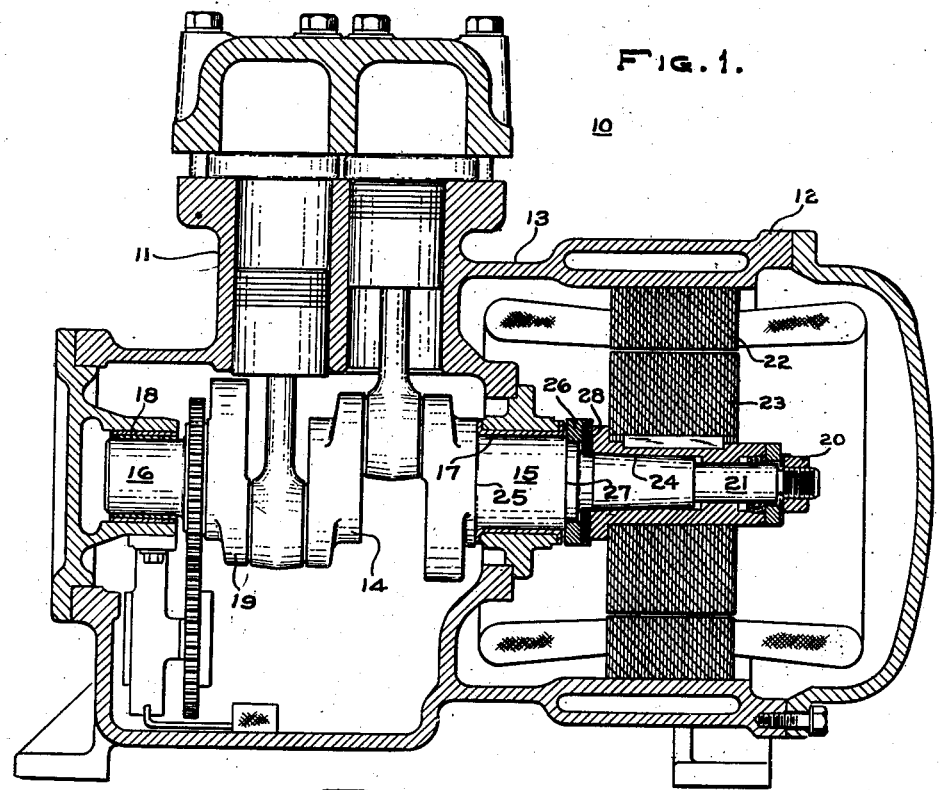
Figure 2:
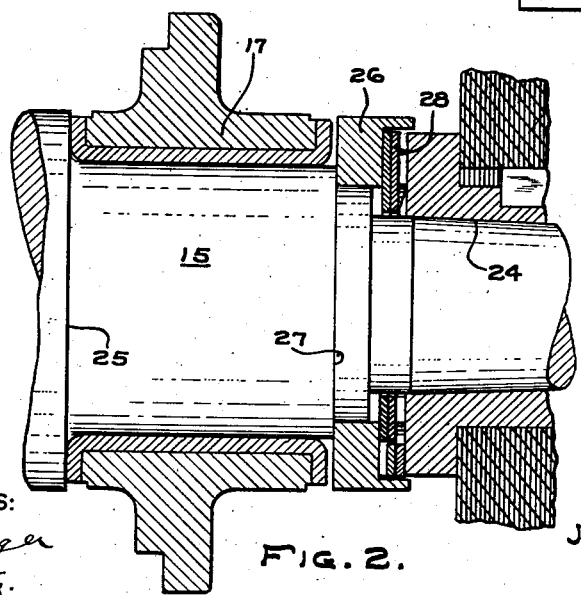

The above and other objects are effected by my invention as will be apparent from the following description and claims taken in connection with the accompanying drawing, forming a part of this application, in which:

Fig. 1 is a longitudinal section of a motor compressor unit incorporating my invention; and Fig. 2 is an enlarged detail sectional view showing the novel thrust bearing construction of the present invention.

Referring to the drawing in detail, I show a motor compressor unit 10, including a reciprocating compressor 11 and a motor 12 direct connected thereto. A fluid-tight casing 13 encloses both the compressor and the motor. A shaft 14 is mounted in the casing 13, being formed with journal portions 15 and 16 which seat in main bearings 17 and 18 carried by the casing structure. The shaft includes a compressor or crank portion 19 between the journal portions 15 and 16 and a motor portion 21 overhung beyond the journal portion 15. The compressor includes pistons, connecting rods, etc., but, inasmuch as the invention does not involve the particular construction of the compressor, it is not necessary to further describe the same.

The motor includes a stator 22 and a rotor 23, and the particular type of construction of the motor need not be considered except to note that the rotor 23 is mounted on the motor portion 21 of the shaft by a tapered fit shown at 24. The rotor is driven onto the shaft until a tight tapered fit is obtained, and it will be appreciated that variations obtained in manufacture will result in some variation in the axial position of the rotor on the shaft. The rotor is retained on the shaft by suitable means such as a nut 20 screw threaded on the end of the shaft.

The present invention relates to an improved means for fixing the longitudinal position of the shaft. In accordance therewith, the main bearing 17 is used as a thrust bearing as well as a journal bearing. The shaft is formed with a shoulder 25 which is adapted to engage the compressor or left-hand side of the bearing 17. A thrust collar 26 is mounted on the shaft and is adapted to engage the motor or right-hand side of the bearing 17. The shaft is formed with a second shoulder 27 for locating the thrust collar 26 thereon. The thrust collar is held firmly against the shoulder 27 by thrust springs 28 interposed between the thrust collar and the rotor 23.

The parts are made so that the distance between the thrust shoulder 25 and the left-hand or thrust face of the collar 26 exceeds the width of the bearing 17 by a suitable working clearance, such as .005 inch.

The thrust spring 28 exerts a force on the thrust collar 26 which is greater than any thrust that is encountered in the operation of the motor compressor unit. The spring allows for variations in the axial position of the rotor 23 on the shaft.

In the operation of the motor compressor unit, the shaft is retained against movement toward the right by abutment of the shoulder 25 against the left-hand side of the bearing, and is retained against movement toward the left by abutment of the thrust collar 26 against the right-hand side of the bearing. The end play of the shaft is limited, therefore, to the small clearance mentioned above, by which the distance between the shoulder 25 and the thrust face of the collar 26 exceeds the width of the bearing 17. This clearance may be more readily and accurately obtained than in constructions heretofore used. The width of the bearing 17 may be rather easily controlled, since the dimension is not great and involves surfaces contained on the same part. Similarly, the distance between the shoulder 25 and the shoulder 27, which determines the position of the thrust face of the collar 26, is easily obtained for the same reasons.

The journal portion 16 of the shaft is free to float axially in the journal bearing 18, and it is not necessary to maintain any part thereof in fixed relation to the journal portion 15 and the bearing 17 within close tolerances.

From the above description, it will be seen that I have provided a novel construction for locating the shaft axially and limiting the end play thereof, which construction involves minimum cost and difficulty in the manufacture thereof. The end play is readily controlled and held at a desirable low value, thereby avoiding noise due to excessive end play; and also avoiding the possibility of binding of the thrust surfaces.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a motor compressor unit, the combination of a stationary structure including a bearing, a shaft including a compressor portion, a motor portion and a journal portion therebetween disposed in said bearing, a motor rotor mounted on the motor portion of the shaft, said shaft having a shoulder adapted to engage the compressor side of said bearing and a thrust collar adapted to engage the motor side of said bearing to fix the longitudinal position of the shaft, said shaft having a second shoulder for locating said thrust collar thereon in such position as to provide a small clearance between the bearing and the thrust collar when said first shoulder contacts said bearing, and spring means reacting against said motor rotor for retaining said thrust collar against said second shoulder.

2. In a direct-connected motor compressor unit, the combination of a shaft having a crank portion, a motor portion, and a journal portion therebetween, a motor rotor mounted on said motor portion of the shaft with a tapered fit, a stationary structure having a thrust and journal bearing adapted to engage said journal portion, said shaft having a first shoulder adapted to engage one side of said bearing and a thrust collar mounted thereon engaging the opposite side of said bearing for fixing the longitudinal position of said shaft, said shaft having a second shoulder for positioning said thrust collar thereon and spring means acting between said thrust collar and said armature for retaining said thrust collar in abutment against said second shoulder, said second shoulder being positioned so that the force of said spring means on said thrust collar is imposed on said second shoulder.

JOHN G. RITTER.